US009549400B2

(12) United States Patent
Seo et al.

(10) Patent No.: US 9,549,400 B2
(45) Date of Patent: Jan. 17, 2017

(54) METHOD AND APPARATUS FOR RECEIVING CONTROL INFORMATION IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 8 days.

(21) Appl. No.: 14/420,878

(22) PCT Filed: Aug. 5, 2013

(86) PCT No.: PCT/KR2013/007034
§ 371 (c)(1),
(2) Date: Feb. 10, 2015

(87) PCT Pub. No.: WO2014/025172
PCT Pub. Date: Feb. 13, 2014

(65) Prior Publication Data
US 2015/0223209 A1 Aug. 6, 2015

Related U.S. Application Data

(60) Provisional application No. 61/681,643, filed on Aug. 10, 2012, provisional application No. 61/692,690, filed on Aug. 23, 2012.

(51) Int. Cl.
*H04W 4/00* (2009.01)
*H04W 72/04* (2009.01)
(Continued)

(52) U.S. Cl.
CPC ......... *H04W 72/042* (2013.01); *H04B 7/0413* (2013.01); *H04L 5/0053* (2013.01);
(Continued)

(58) Field of Classification Search
CPC combination set(s) only.
See application file for complete search history.

(56) References Cited

U.S. PATENT DOCUMENTS 8,537,766 B2 * 9/2013 Hu .................. H04L 5/0023
370/329
8,730,903 B2 * 5/2014 Seo .................. H04B 7/155
370/315
(Continued)

OTHER PUBLICATIONS

LG Electronics, "Discussions on the Association Between Antenna Ports and ePDCCH," 3GPP TSG RAN WG1 #69, R1-122304, May 2012, 6 pages.
(Continued)

*Primary Examiner* — Frank Duong
(74) *Attorney, Agent, or Firm* — Lee, Hong, Degerman, Kang & Waimey

(57) ABSTRACT

One embodiment of the present invention relates to a method for receiving control information through an enhanced physical downlink control channel (EPDCCH) in a wireless communication system, including the steps of: channel estimation in an EPDCCH related physical resource block (PRB) pair set; and, on the basis of the channel estimation, monitoring the EPDCCH in the PRB pair set, wherein, when the number of physical antennas of a transmission point transmitting the EPDCCH is 1, the terminal is assumed to identically precode allocated ports for the EPDCCH.

20 Claims, 9 Drawing Sheets

(51) Int. Cl.
*H04B 7/04* (2006.01)
*H04L 25/02* (2006.01)
*H04L 5/00* (2006.01)

(52) U.S. Cl.
CPC ..... *H04L 25/0202* (2013.01); *H04W 72/0446* (2013.01); *H04L 5/0023* (2013.01); *H04L 5/0048* (2013.01)

(56) References Cited

U.S. PATENT DOCUMENTS

| | | | |
|---|---|---|---|
| 2011/0268062 A1 | 11/2011 | Ji et al. | |
| 2013/0064215 A1* | 3/2013 | Gao | H04L 5/0016 370/330 |
| 2013/0182664 A1* | 7/2013 | Chen | H04W 72/042 370/329 |

OTHER PUBLICATIONS

LG Electronics, "Discussions on Association Between DM-RS Ports and EPDCCH Transmission," 3GPP TSG RAN NG1 #70, R1-123530, Aug. 2012, 5 pages.

New Postcom, "Association Between DMRS Ports and ePDCCH Transmission," 3GPP TSG RAN WG1 #70, R1-123430, Aug. 2012, 3 pages.

European Patent Office Application Serial No. 13827487.3, Search Report dated Feb. 23, 2016, 9 pages.

NTT DOCOMO, "DM-RS Antenna Port Determination for ePDCCH," 3GPP TSG RAN WG1 Meeting #69, R1-121974, May 2012, 4 pages.

Research in Motion, et al., "DMRS Port Assignment to E-PDCCH and Channel Estimation Complexity," 3GPP TSG RAN WG1 Meeting #69, R1-122723, May 2012, 7 pages.

MediaTek Inc., "DRS Antenna Port Determination for ePDCCH Decoding," 3GPP TSG-RAN WG1 #69, R1-122163, May 2012, 5 pages.

Huawei, et al., "Correction on precoding with DMRS for single layer transmission," 3GPP TSG-RAN WG1 Meeting #69, R1-122515, May 2012, 2 pages.

PCT International Application No. PCT/KR2013/007034, Written Opinion of the International Searching Authority dated Nov. 21, 2013, 18 pages.

* cited by examiner

FIG. 6
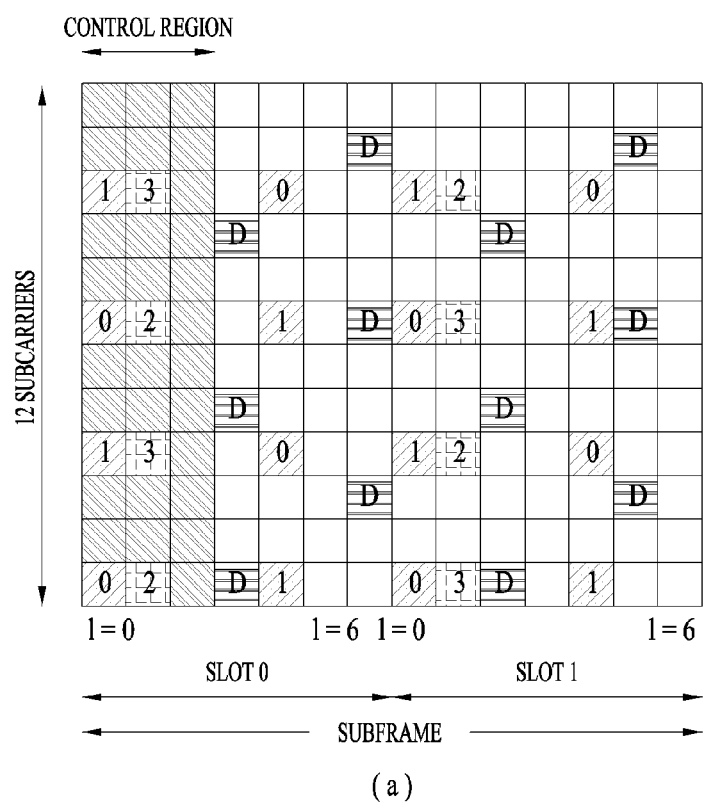
(a)
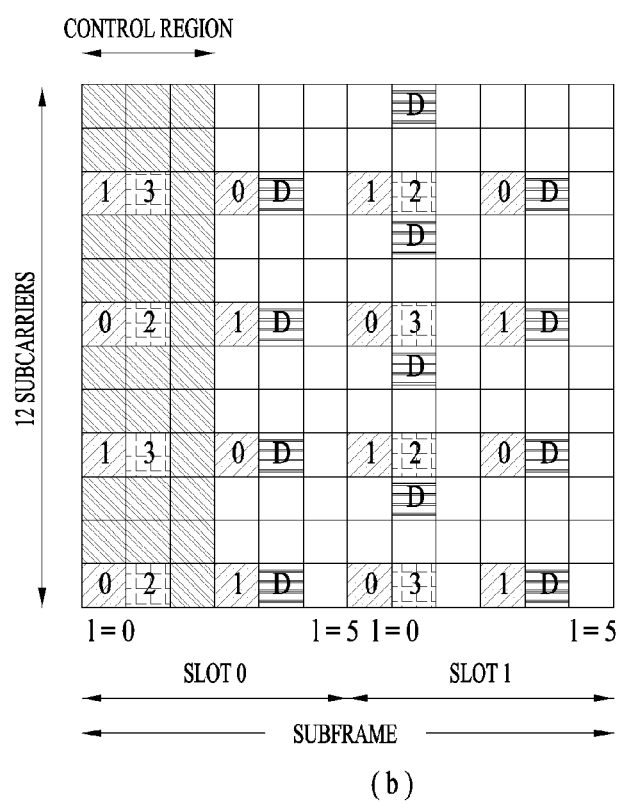
(b)

FIG. 7
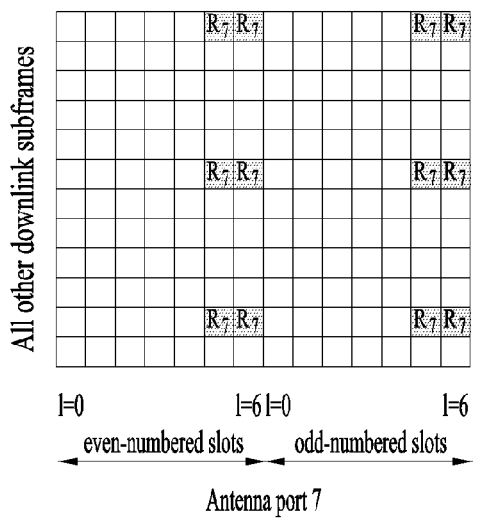
Antenna port 7
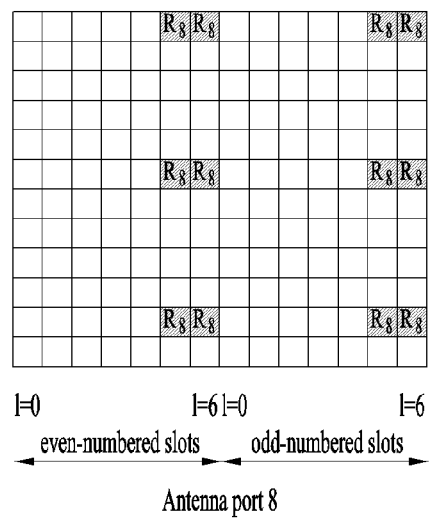
Antenna port 8
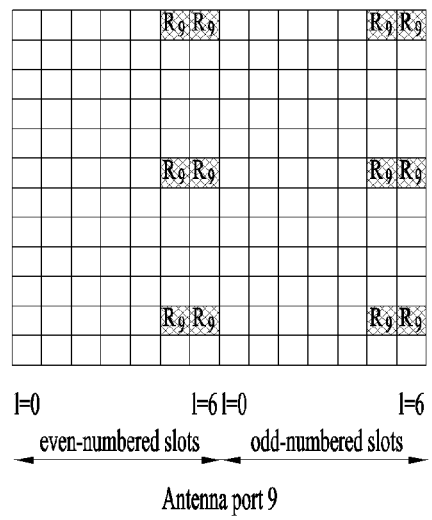
Antenna port 9
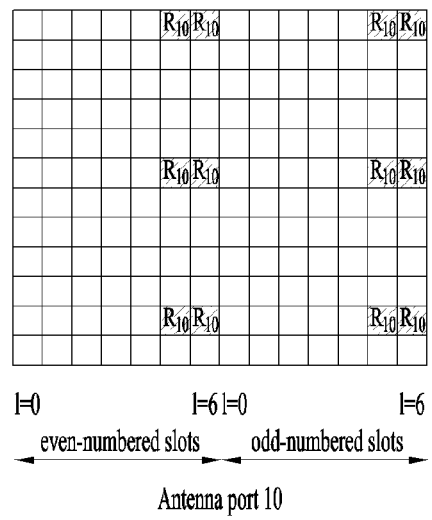
Antenna port 10

METHOD AND APPARATUS FOR RECEIVING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/007034, filed on Aug. 5, 2013, which claims the benefit of U.S. Provisional Application Ser. No. 61/681,643, filed on Aug. 10, 2012 and 61/692,690, filed on Aug. 23, 2012, the contents of which are all hereby incorporated by reference herein in their entirety.

TECHNICAL FIELD

The present invention relates to a wireless communication system and more particularly, to a method and apparatus for receiving control information on an Enhanced Physical Downlink Channel (EPDCCH).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

DISCLOSURE

Technical Problem

An object of the present invention devised to solve the conventional problem is to provide a method for performing channel estimation and receiving control information, when the control information is received on an Enhanced Physical Downlink Control Channel (EPDCCH), particularly when a transmitter has a single physical antenna.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving control information on an Enhanced Physical Downlink Control Channel (EPDCCH) by a User Equipment (UE) in a wireless communication system includes performing channel estimation on a Physical Resource Block (PRB) pair set related to an EPDCCH, and monitoring the EPDCCH in the PRB pair set based on the channel estimation. The UE assumes that the same precoding is applied to ports allocated to the EPDCCH when a transmission point transmitting the EPDCCH has a single physical antenna.

In another aspect of the present invention, a UE for receiving control information on an EPDCCH in a wireless communication system includes a reception module, and a processor. The processor is configured to perform channel estimation on a PRB pair set related to an EPDCCH, to monitor the EPDCCH in the PRB pair set based on the channel estimation, and to assume that the same precoding is applied to ports allocated to the EPDCCH when a transmission point transmitting the EPDCCH has a single physical antenna.

The above aspects of the present invention may include the followings.

The assumption may mean that use of Demodulation Reference Signals (DMRSs) related to all of the ports allocated to the EPDCCH is allowed for the channel estimation.

If the PRB pair set is for localized EPDCCH transmission, the assumption may be valid only when a representative antenna port is not used.

The UE may determine that the PRB pair set is for distributed EPDCCH transmission.

The UE may perform the channel estimation using a DMRS corresponding to a port related to distributed EPDCCH transmission.

The number of physical antennas may be determined by the number of Cell-specific Reference Signal (CRS) ports of the transmission point.

The UE may determine the number of CRS ports to be the number of physical antennas.

The number of CRS ports may be acquired by blind decoding of a Physical Broadcast Channel (PBCH).

The number of physical antennas may be determined by the number of ports used for Channel State Information-Reference Signal (CSI-RS) transmission from the transmission point transmitting the EPDCCH.

Information about the transmission point transmitting the EPDCCH and the number of ports may be transmitted via higher-layer signaling.

The transmission point transmitting the EPDCCH is a transmission point using a CSI-RS configuration having an initial value equal to an initial scrambling sequence value of a DMRS related to the EPDCCH.

The transmission point may be one of a plurality of transmission points configured to transmit an EPDCCH to the UE.

Advantageous Effects

According to the present invention, even though a transmitter has a single physical antenna, predetermined channel estimation performance can be ensured.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 6 is a view referred to for describing Reference Signals (RSs);

FIG. 7 is a view referred to for describing Carrier Aggregation (CA);

BEST MODE FOR CARRYING OUT THE INVENTION

Figure 1:
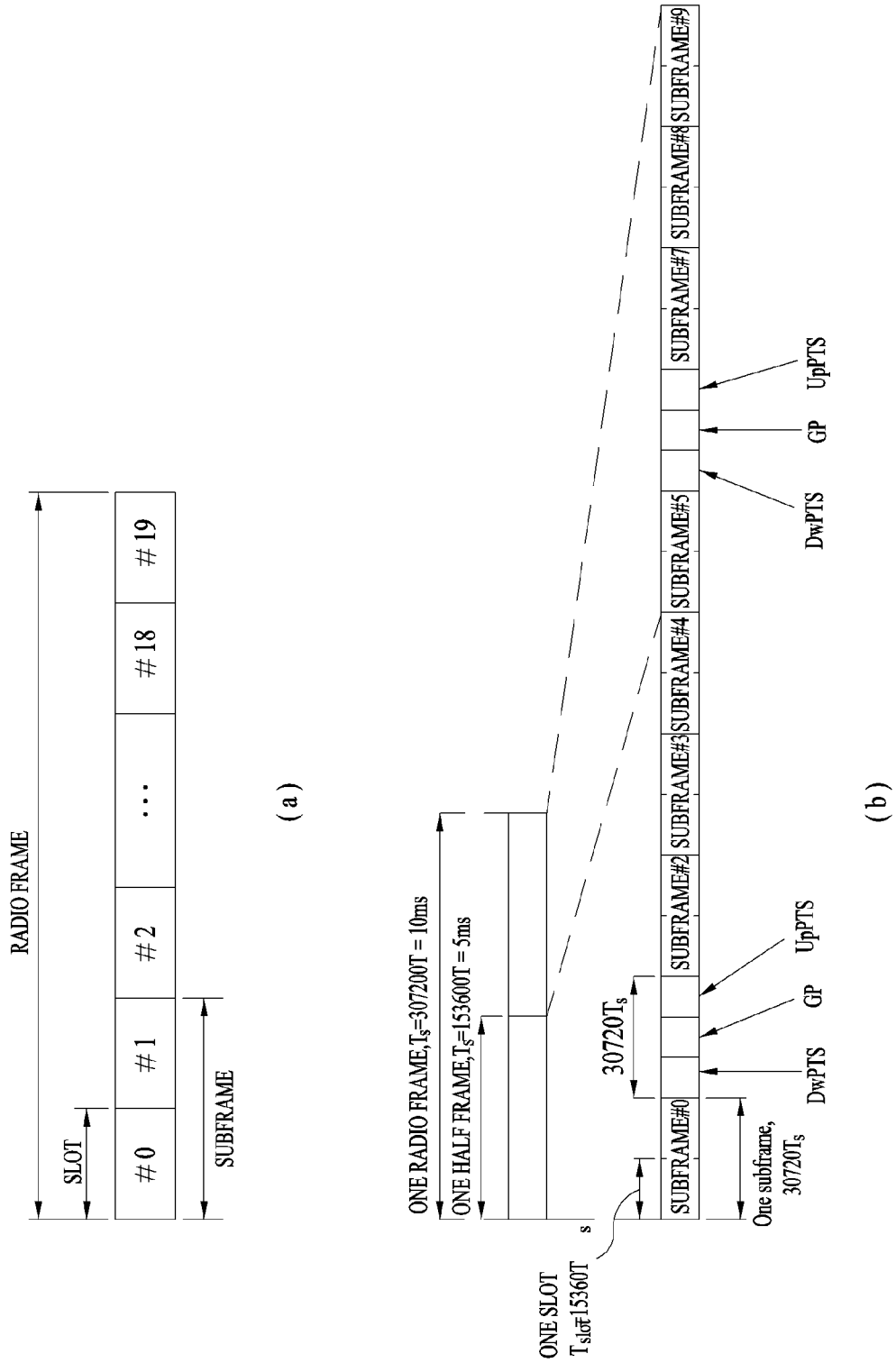
FIG. 1 illustrates a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Subframe Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(*a*) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. The extended CP may be used to reduce inter-symbol interference when a channel state is unstable as in the case of high speed movement of a UE.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
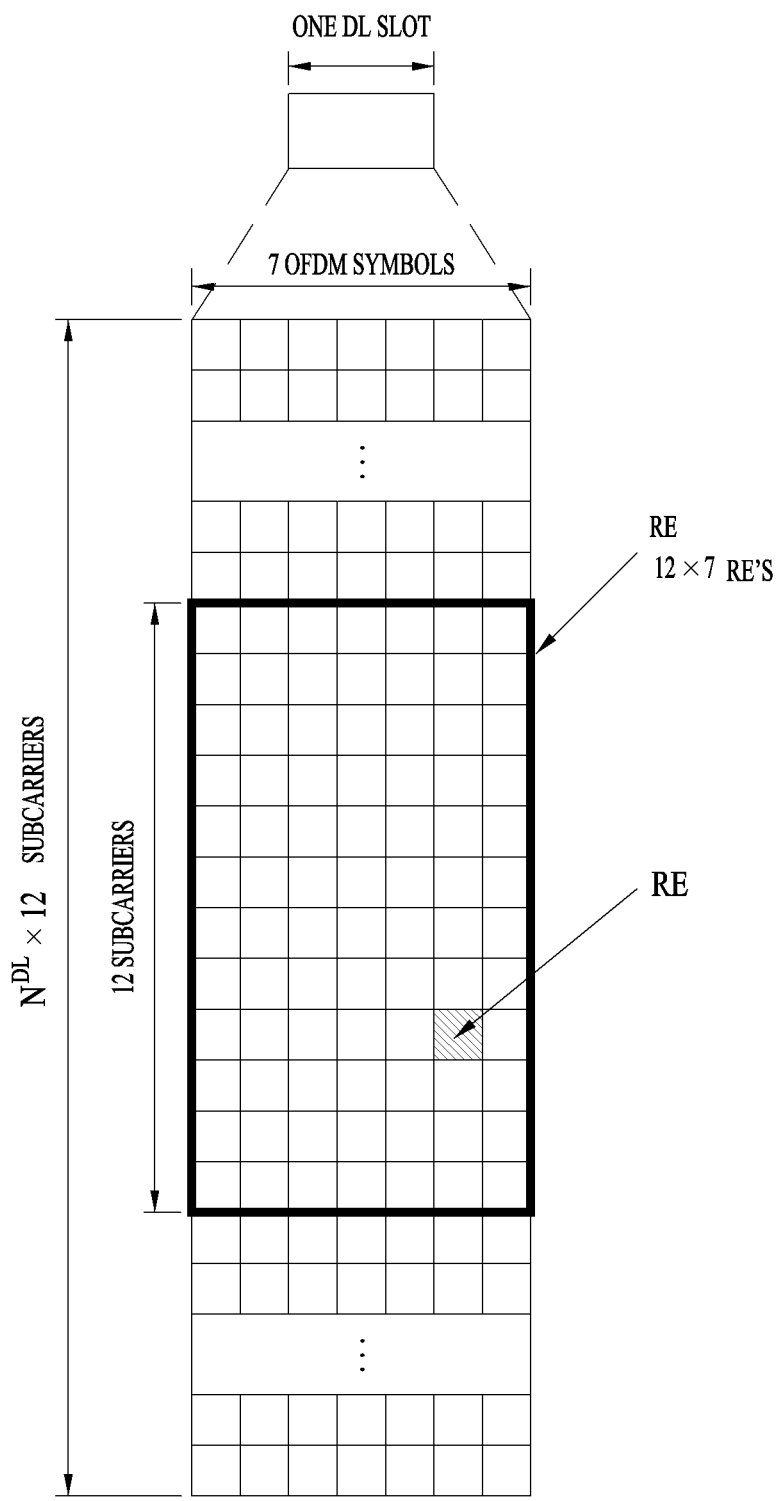
FIG. 2 illustrates a resource grid for the duration of a downlink slot.

FIG. 2 illustrates a resource grid for the duration of a downlink slot (DL). One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
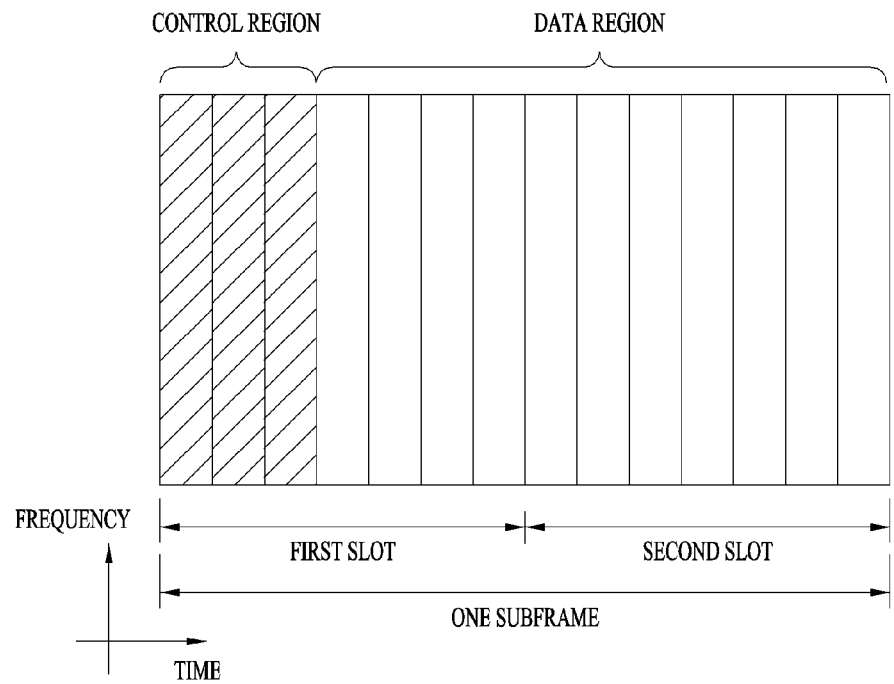
FIG. 3 illustrates a downlink subframe structure.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
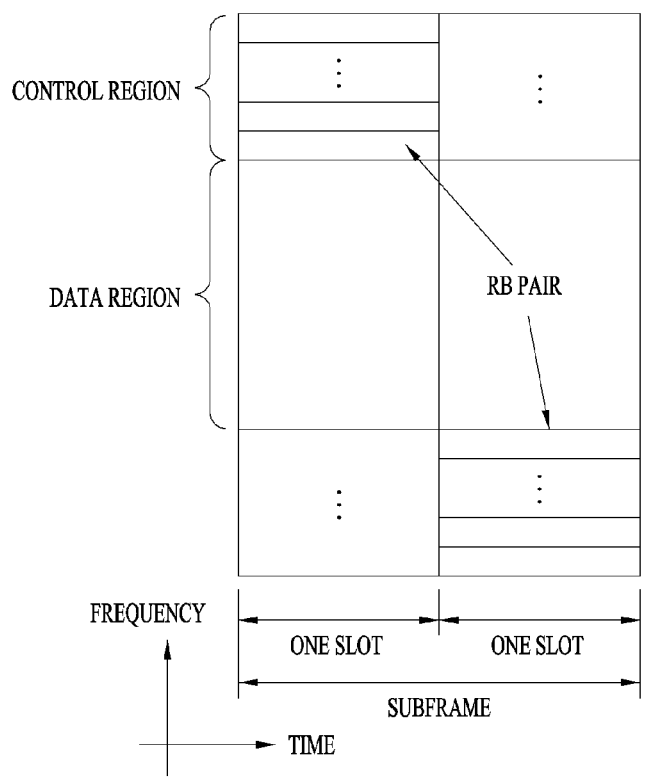
FIG. 4 illustrates an uplink subframe structure.

FIG. 4 illustrates an uplink (UL) subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

DCI Format

Currently, DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. According to purposes of control information to be transmitted, the DCI formats may be divided into i) DCI formats 0 and 4, which are used for uplink grant, ii) DCI formats 1, 1A, 1B, 1C, 1D, 2, 2A, 2B and 2C, which are used for downlink scheduling allocation, and iii) DCI formats 3 and 3A, which are for power control commands.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is a new format added to LTE-A Release 10, supports application of spatial multiplexing to uplink transmission in LTE-A. DCI format 4 has a larger message size than DCI format 0 since it further includes information for spatial multiplexing. DCI format 4 includes additional control information in addition to the control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A as it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation, but includes neither a carrier indicator nor a redundancy version, compared to the other formats.

DCI format 1A is intended for downlink scheduling and random access. DCI format 1A may include a carrier indicator, an indicator for indicating whether or not downlink distributed transmission is used, PDSCH resource allocation information, a modulation and coding scheme, a redundancy version, a HARQ processor number for indicating a processor used for soft combining, a new data indicator used to empty a buffer to implement initial transmission in relation to a HARQ process, a TPC command for a PUCCH, and an uplink index necessary for TDD operation.

DCI format 1 includes control information similar to that of DCI format 1A. DCI format 1 supports non-contiguous resource allocation, whereas DCI format 1A is related to contiguous resource allocation. Accordingly, DCI format 1 further includes a resource allocation header, and thus slightly increases control signaling overhead as a trade-off for increase in flexibility of resource allocation.

Both DCI formats 1B and 1D further include precoding information, compared to DCI format 1. DCI format 1B includes PMI acknowledgement, and DCI format 1D includes downlink power offset information. Most control information included in DCI formats 1B and 1D corresponds to that of DCI format 1A.

DCI formats 2, 2A, 2B and 2C basically include most of the control information included in DCI format 1A and further include information for spatial multiplexing. In this embodiment, the information for spatial multiplexing corresponds to a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, and a 2-bit command is used per UE in the case of DCI format 3A.

One of the DCI formats described above is transmitted over a PDCCH, and a plurality of PDCCHs may be transmitted in the control region. A UE may monitor the plurality of PDCCHs.

PDCCH Processing

Control channel elements (CCEs), which are contiguous logical allocation units, are used in mapping a PDCCH to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH, it is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is a set of candidate PDCCHs composed of CCEs which the UE needs to attempt to decode at an aggregation level. Each aggregation level and the corresponding number of candidate PDCCHs may be defined as shown in Table 2.

TABLE 2

| | Search space | | |
|---|---|---|---|
| | Aggregation level | Size (in CCE units) | Number of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, there are 4 aggregation levels, and the UE has a plurality of search spaces according to the aggregation levels. The search spaces may be divided into a UE-specific search space (USS) and a common search space (CSS), as shown in Table 2. The UE-specific search space is for specific UEs. Each UE may check an RNTI and CRC with which the PDCCH is masked, by monitoring the UE-specific search space thereof (attempting to decode a PDCCH candidate set according to a possible DCI format) and acquire control information if the RNTI and CRC are valid.

The CSS is intended for use in the case in which a plurality of UEs or all UEs need to receive PDCCHs, as in the cases of system information dynamic scheduling and paging messages. The CSS may be used for a specific UE in terms of resource management. Furthermore, the CSS may overlap the USS.

Specifically, the search space may be determined by Equation 1 given below.

$$L\left\{(Y_k + m') \bmod \left\lfloor \frac{N_{CCE,k}}{L} \right\rfloor\right\} + i \qquad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)} \cdot n_{CI}$ otherwise, $m'=m$. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as 1=0, 1, . . . , L−1. For the CSS, $Y_k$ is always determined to be 0.

Figure 5:
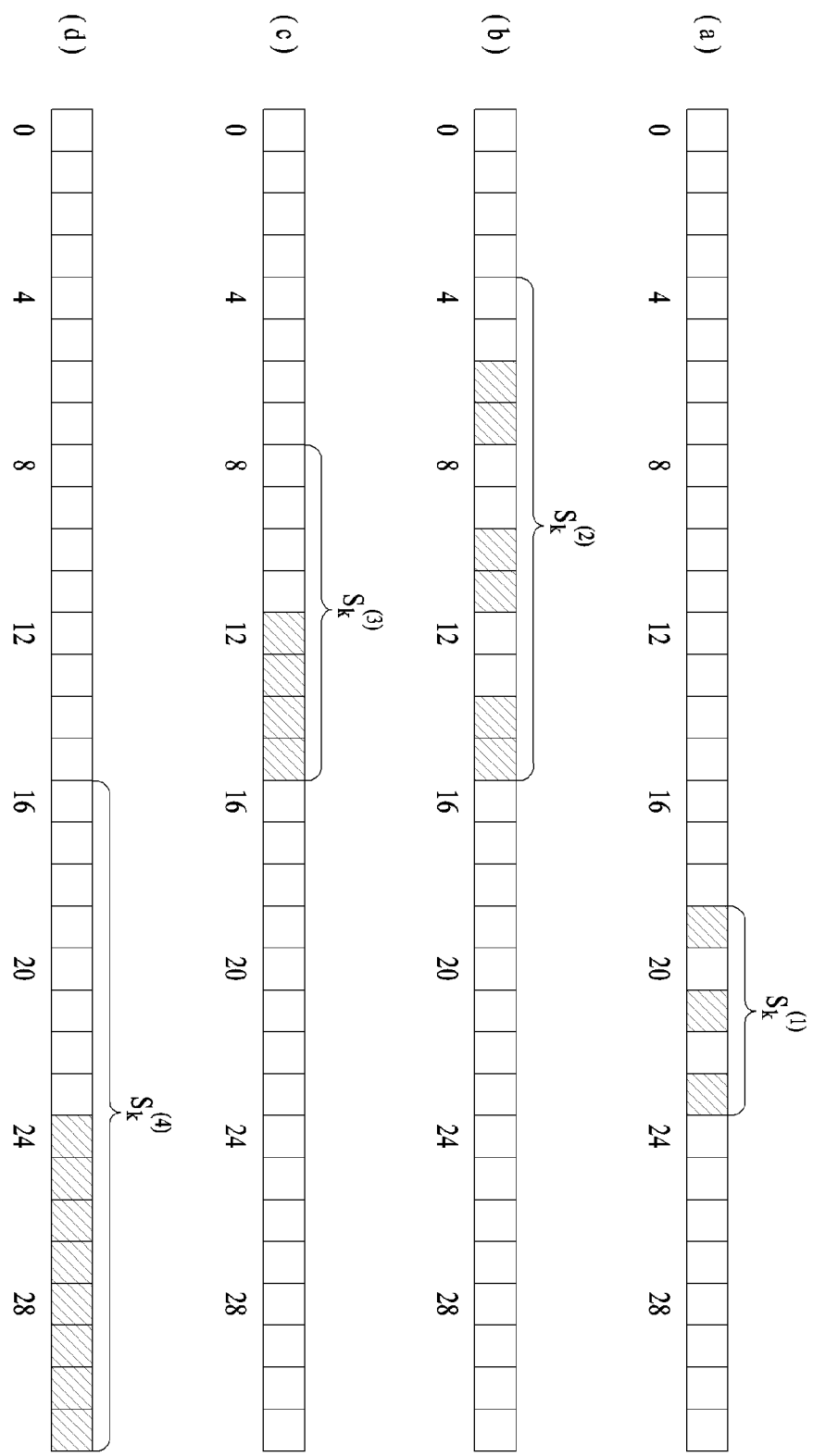
FIG. 5 is a view referred to for describing a search space.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined for a UE at the respective aggregation levels in the same subframe according to the modulo function and L. The start CCE is always determined to correspond to a multiple of the corresponding aggregation level due to L. In the description given below, $Y_k$ is exemplarily assumed to be CCE number 18. The UE attempts to sequentially decode the CCEs starting with the start CCE in units of CCEs determined for a corresponding aggregation level. In FIG. 5(b), for example, The UE attempts to decode the CCEs two by two, starting with CCE 4, which is the start CCE, according to the aggregation level.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times in the CSS, in consideration of two DCI sizes (DCI formats 0/1A/3/3A and DCI format 1C) for each of six PDCCH candidates. In the USS, the UE needs to attempt to perform decoding up to 32 times, in consideration of two DCI sizes for each of 16 (6+6+2+2=16) PDCCH candidates. Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE (i.e., to geolocate a UE).

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in situations such as handover. The latter is an RS that a BS (eNB) transmits along with downlink data in specific resources. A UE can demodulate the data by measuring a channel using the RS. This RS should be transmitted in a data transmission area.

CRSs serve two purposes, namely, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the BS (eNB) has two Tx antennas, CRSs for antenna ports 0 and 1 are transmitted. In the case of four Tx antennas, CRSs for antenna ports 0 to 3 are respectively transmitted.

FIG. 6 is a view referred to for describing Reference Signals (RSs). FIG. 6 illustrates patterns in which CRSs and DRSs are mapped to a downlink RB pair, as defined in a legacy 3GPP LTE system (e.g. Release-8). An RS mapping unit, i.e. a downlink RB pair may include one subframe in time by 12 subcarriers in frequency. That is, an RB pair includes 14 OFDM symbols in time in the case of the normal CP (see FIGS. 6(a)) and 12 OFDM symbols in time in the case of the extended CP (see FIG. 6(b)).

In FIG. 6, the positions of RSs in an RB pair for a system where a BS (eNB) supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

DeModulation Reference Signal (DMRS)

DMRS is a reference signal that is defined by a UE to implement channel estimation for PDSCH. DMRS may be used in Tx ports 7, 8, and 9. In the initial stages, although DMRS has been defined for transmission of a single layer corresponding to an antenna port 5, the DMRS has been extended for spatial multiplexing of a maximum of 8 layers. DMRS is transmitted only for a single specific UE as can be seen from a UE-specific reference signal (RS) corresponding to a different name of DMRS. Accordingly, DMRS can be transmitted only in an RB in which PDSCH for the specific UE is transmitted.

DMRS generation for a maximum of 8 layers will hereinafter be described in detail. In case of DMRS, a reference signal sequence r(m) generated by Equation 2 may be mapped to a complex-valued modulation symbols $a_{k,l}^{(p)}$ obtained by Equation 3. FIG. 7 shows that DMRS is mapped to a resource grid of a subframe in case of a general CP, and relates to antenna ports 7 to 10.

$$r(m) = \frac{1}{\sqrt{2}}(1 - 2c(2m)) + j\frac{1}{\sqrt{2}}(1 - 2 \cdot c(2m+1)),$$ [Equation 2]

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

In Equation 2, r(m) is a reference signal sequence, c(i) is a pseudo-random sequence, and $N_{RB}^{max,DL}$ is a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m')$$ [Equation 3]

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{Case of special subframe} \\ & \text{configurations} \\ & 3, 4, 8, 9 \\ l'\bmod 2 + 2 + 3\lfloor l'/2 \rfloor & \text{Case of special subframe} \\ & \text{configurations} \\ & 1, 2, 6, 7 \\ l'\bmod 2 + 5 & \text{Case in which special} \\ & \text{subframe is not given} \\ 0, 1, 2, 3 & n_s\bmod 2 = 0, \text{Case of special subframe} \\ & \text{configurations } 1, 2, 6, 7 \\ 0, 1 & n_s\bmod 2 = 0, \text{Case in which special} \\ & \text{subframe configurations } 1, 2, 6, 7 \text{ are} \\ & \text{not given} \\ 2, 3 & n_s\bmod 2 = 1, \text{Case in which special} \\ & \text{subframe configurations} 1, 2, 6, 7 \text{ are} \\ & \text{not given} \end{cases}$$

$$m' = 0, 1, 2$$

As can be seen from Equation 3, an orthogonal sequence $\overline{w}_p(i)$ shown in the following Table 3 is applied to the reference signal sequence r(m) when r(m) is mapped to a complex modulation symbol.

TABLE 3

| Antenna port $p$ | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

DMRS may perform channel estimation in different ways according to a spreading factor of 2 or 4. Referring to Table 1, an orthogonal sequence is repeated in the form of [a b a b] at antenna ports 7 to 10, such that the spreading factor is set to 2 at antenna ports 7~10 and the spreading factor is set to 4 at antenna ports 11~14. If the spreading factor is set to 2, a UE may despread each of a DMRS of a first slot and a DMRS of a second slot to the spreading factor of 2, and then perform channel estimation through time interpolation. If the spreading factor is set to 4, DMRS of the entire subframe is despread to the spreading factor of 4 at one time, such that channel estimation can be performed.

In the case of using the spreading factor of 2, the spreading-factor based channel estimation scheme may acquire not only a gain obtained because time interpolation is applied at high mobility, but also a gain of a decoding time because despreading to DMRS of the first slot is possible. In case of using the spreading factor of 4, the spreading-factor based channel estimation scheme can also support many more UEs or ranks.

Figure 8:
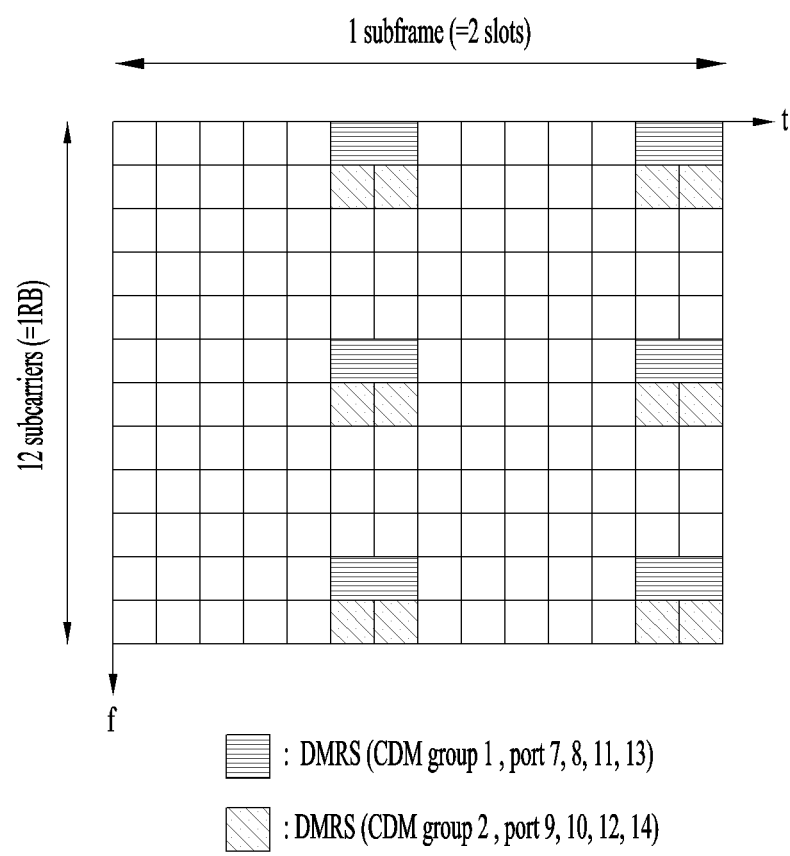
FIG. 8 is a view referred to for describing cross carrier scheduling.

The DMRS overhead aspect will hereinafter be described with reference to FIG. 8. FIG. 8 shows that DMRS is mapped to a subframe at each of antenna ports 7 to 14. As shown in FIG. 8, DMRS may be classified into CDM (Code Divisional Multiplexing) Group 1 and CDM Group 2 according to a resource-grid mapping position. In an RE corresponding to CDM Group 1, DMRS is transmitted through antenna ports 7, 8, 11, and 13. In an RE corresponding to CDM Group 2, DMRS is transmitted through antenna ports 9, 10, 12, and 14. That is, REs for DMRS transmission are identical to each other in an antenna port contained in one CDM group. Assuming that DMRS is transmitted only using the antenna port corresponding to CDM Group 1, the number of resource elements (REs) needed for DMRS is 12. That is, DMRS overhead is denoted by 12. Likewise, if the antenna port corresponding to CDM Group 2 is used, DMRS overhead is denoted by 24.

Enhanced PDCCH (EPDCCH)

The EPDCCH that may be transmitted in a legacy PDSCH region is under consideration as a solution to the lack of PDCCH capacity and inter-cell interference caused by Coordinated Multi-Point (CoMP), Multi-User Multiple Input Multiple Output (MU-MIMO), etc. in an LTE system conforming to release 11 or beyond. Compared to a legacy CRS-based PDCCH, the EPDCCH allows for DMRS-based channel estimation to achieve a precoding gain.

To receive/acquire DCI on an EPDCCH, a UE may perform blind decoding as in a legacy LTE/LTE-A system. More specifically, the UE may attempt to decode (monitor) a set of EPDCCH candidates for each aggregation level according to DCI formats corresponding to a transmission mode configured for the UE. The monitored set of EPDCCH candidates may be referred to as a UE-specific EPDCCH search space and this search space may be configured/set on an aggregation level basis. Unlike the afore-described legacy LTE/LTE-A system, aggregation levels 1, 2, 4, 8, 16, and 32 are available according to a subframe type, a CP length, and the amount of available resources in a PRB pair.

When an EPDCCH is configured for a UE, the UE indexes REs included in a PRB pair set into EREGs and then indexes the EREGs into ECCEs. The UE may determine EPDCCH candidates forming a search space based on the indexed ECCEs and perform blind decoding, thereby receiving control information. Conceptually, EREG corresponds to REG and ECCE corresponds to CCE in LTE/LTE-A. One PRB pair may include 16 EREGs.

Depending on the configuration of a PRB pair used for EPDCCH transmission, localized EPDCCH transmission and distributed EPDCCH transmission may be defined. The localized EPDCCH transmission means that ECCEs used for transmission of DCI are contiguous in the frequency domain, and specific precoding may be used to achieve a beamforming gain. For example, the localized EPDCCH transmission may be based on as many contiguous ECCEs as determined by an aggregation level. On the contrary, the distributed EPDCCH transmission means that one EPDCCH is transmitted in a PRB pair distributed in the frequency domain. The distributed EPDCCH transmission offers a frequency diversity gain. For example, the distributed EPDCCH transmission may be based on an ECCE having 4 EREGs (special subframe configurations 1, 2, 6, 7, and 9. 8 EPREGs in the case of extended CP) included in each distributed PRB pair.

Among transmission points (femto cells, micro cells, etc.) transmitting EPDCCHs as described above, there may be a transmission point having a single physical antenna for transmission. In the case of a single physical antenna, a plurality of DMRS ports may be allocated but MIMO, beamforming, etc. may be limited by the plurality of DMRS ports. Accordingly, there is a need for an additional method for improving the EPDCCH channel estimation performance of a UE, in the case of a single transmission antenna, which will be described below in detail.

The transmission point may allocate a plurality of DMRS ports (e.g., ports 7 and 9 or ports 8 and 10) (or in a transmission scheme using a plurality of DMRS ports) and apply the same precoding to the DMRS ports when a transmission point has a single physical antenna. In this case, since the UE performs channel estimation using a plurality of RS ports, the UE may have improved channel estimation performance.

For example, when the UE receives control information on an EPDCCH, the UE may perform channel estimation in a PRB pair set related to the EPDCCH and may monitor EPDCCHs in the PRB pair set based on the channel estimation. If a transmission point transmitting the EPDCCH has a single physical antenna, the UE assumes that the same precoding is applied to ports allocated to the EPDCCH. In other words, the UE may perform channel estimation using DMRSs corresponding to the ports allocated to the EPDCCH. That is, this assumption may imply that use of DMRSs related to all ports allocated to the EPDCCH is allowed for channel estimation.

Figure 9:
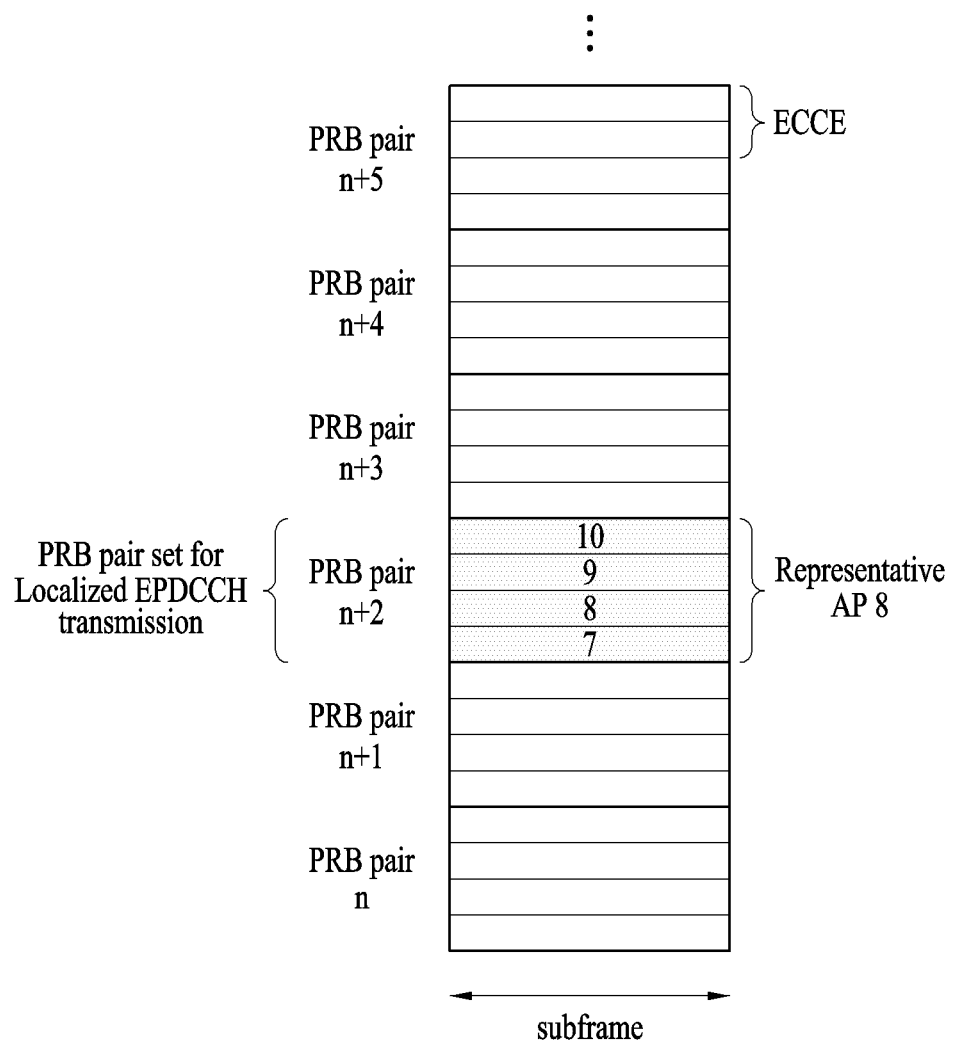
FIG. 9 is a view referred to for describing channel estimation according to an embodiment of the present invention.

The assumption may be valid only when a representative antenna port is not used when the above PRB pair set is for localized EPDCCH transmission. More specifically, referring to FIG. 9, it is assumed that a PRB pair set is a for localized EPDCCH transmission, including PRB pair n+2, ports 7, 8, 9, and 10 are allocated to the ECCEs of PRB pair n+2, and port 8 may be selected as a representative antenna port. If the representative antenna port 8 is not used for EPDCCH transmission of aggregation level 4, the ECCEs are transmitted respectively through ports 7, 8, 9, and 10. If the UE assumes that the same precoding is applied to these ports, the UE may perform channel estimation using DMRSs of ports 7, 8, 9, and 10. That is, the UE may perform channel estimation using 24 DMRS REs. Since additional signaling may be needed to indicate whether the representative antenna port has been used, if a cell has a single physical antenna, the cell may be configured to operate only on a distributed EPDCCH. That is, the PRB pair set is always regarded as for distributed EPDCCH transmission.

On the other hand, if the PRB pair set is for distributed EPDCCH transmission, the transmission point may apply the same precoding to different ports allocated for the distributed EPDCCH transmission (ports belonging to different CDM groups). The UE may perform channel estimation using all allocated ports, assuming that the same precoding has been applied to the allocated ports. The same precoding may be applied to frequency resources on a PRB pair basis.

As stated before, additional signaling may be required for the above operation of the UE, which will be described below. Different ports may mean ports of different CDM groups. That is, a combination of port 7 (8 or 10) and port 8 (7 or 9) may be considered. The followings may be signaled independently or in combination to a UE.

- The transmission point may signal whether resources (frequency and/or time resources, for example, an RB set, a subframe set, etc.) are used for localized EPDCCH transmission or distributed EPDCCH transmission. If EPDCCHs are distinguished by resources such as allocation of separate search spaces for localized EPDCCH transmission and distributed EPDCCH transmission, the signaling may not be performed.
- The transmission point may indicate whether a representative antenna port is used for localized EPDCCH transmission.
- The transmission point may signal the indexes of EREGs of ECCEs (or an EREG to ECCE mapping rule). More specifically, the transmission point may configure one ECCE with EREGs to which different ports are allocated. In this case, the transmission point may signal the indexes of the EREGs. Or an EREG to ECCE mapping rule for the case of sharing the same port and an EREG to ECCE mapping rule for the case of using different ports may be preset and the transmission point may signal which mapping rule to use.
- The transmission point may signal whether the same precoding is applied to a plurality of ports allocated to transmission of one EPDCCH/DCI, that is, whether the UE may assume the same precoding.

The following operation may be performed based on the above-described signaling. When the transmission point transmits an EPDCCH at aggregation level 1 in a localized manner, the transmission point may allocate EREGs corresponding to different ports in one PRB pair to the UE and perform the same precoding on the different ports. In this case, the transmission point may indicate to the UE that a localized EPDCCH is used, one ECCE includes EREGs mapped to different ports, and the same precoding is performed by separate signalings or one signaling. The UE may receive the signaling(s) and use different ports (the ports corresponding to the respective EREGS of an ECCE) during channel estimation for EPDCCH decoding. In another example, if non-selection of a representative antenna port for a localized EPDCCH of aggregation level 2 or higher (equivalent to performing of the same precoding) is signaled to the UE, the UE may perform channel estimation, assuming that the same precoding is applied to the ports of respective ECCEs.

The above operation may be performed only when the UE is aware that the transmission point has one physical antenna. In other words, the UE needs to determine the number of physical antennas of a transmission point that transmits a PRB pair set related to an EPDCCH. Now, a description will be given of methods for determining the number of physical antennas of a transmission point by a UE.

Figure 10:
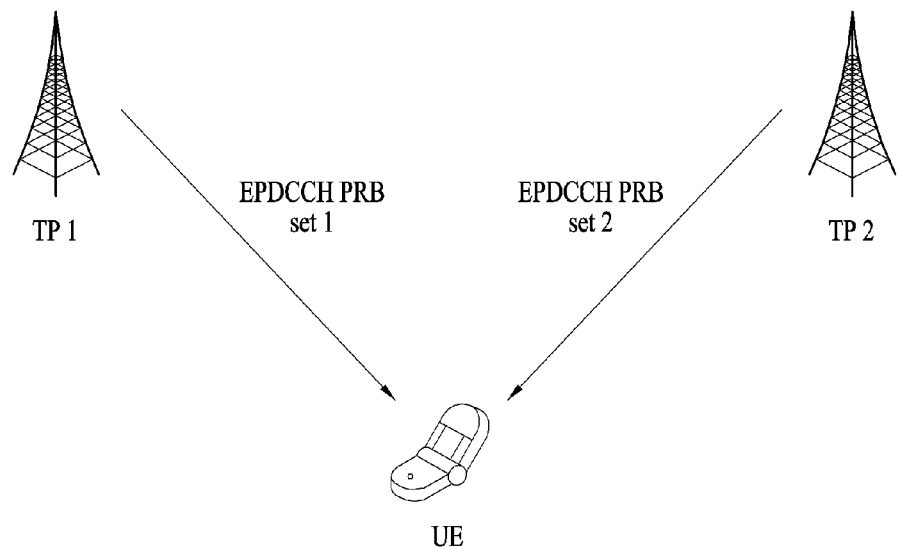
FIG. 10 is a view related to determination of the number of physical antennas according to an embodiment of the present invention.

The UE may determine the number of physical antennas of the transmission point using the number of CRS ports of the transmission point. That is. The UE determines how many ports the transmission point transmitting an EPDCCH uses for CRSs and determines the number of the CRS ports to be the number of physical antennas. If only a serving cell transmits an EPDCCH, the number of ports used for CRS transmission may be determined by blind decoding of a Physical Broadcast Channel (PBCH). In the case of Dynamic Point Selection (DPS) of an EPDCCH, it is difficult to determine the number of ports by a PBCH. As illustrated in FIG. 10, for example, if a first transmission point (TP 1) transmits a first EPDCCH PRB set (EPDCCH PRB set 1) and a second transmission point (TP 2) transmits a second EPDCCH PRB set (EPDCCH PRB set 2), the number of CRS ports may be obtained from information about a cell transmitting an EPDCCH linked to each EPDCCH PRB set. That is, the information about the cell transmitting the EPDCCH includes information about the number of CRS ports of the cell and this information may be transmitted by higher-layer signaling. If a Quasi-CoLocation (QCL) relationship between an EPDCCH PRB set and CRSs of a specific cell is signaled (this singling may include the number of CRS ports), the UE may determine the number of physical antenna ports using information about the CRSs placed in the QCL relationship.

The UE may determine the number of physical antennas of a transmission point transmitting an EPDCCH using the number of CSI-RS ports of the transmission point. That is, the UE may determine the number of CSI-RS ports used by the transmission point transmitting the EPDCCH and determine the number of CSI-RS ports to be the number of physical antennas. For example, the UE may assume that the serving cell transmits all EPDCCHs and determine the number of CSI-RS ports corresponding to the serving cell to be the number of physical antennas. If a plurality of CSI-RSs are configured, the UE may determine a maximum/minimum value between the number of antenna ports corresponding to a predetermined specific CSI-RS configuration (e.g., a first CSI-RS configuration having the lowest index) and the number of antenna ports corresponding to a CSI-RS configuration configured for the UE to be the number of physical antennas. As illustrated in the example of FIG. 10, if a plurality of EPDCCH sets are configured for a UE, a transmission point may transmit information about an EPDCCH transmission point linked to each EPDCCH set by higher-layer signaling such as RRC signaling. This information may include information about the number of CSI-RS ports of each transmission point. If the QCL relationship between an EPDCCH PRB set and a CSI-RS of a specific cell is signaled (this signaling may include information about the number of CRS ports), the UE may determine the number of physical antenna ports using information about the CSI-RS placed in the QCL relationship. The UE may assume that an EPDCCH is transmitted by a transmission point using a CSI-RS configuration having an initial value equal to an initial scrambling sequence value of a DMRS related to the EPDCCH. That is, the UE may detect the CSI-RS linked to the EPDCCH from the EPDCCH DMRS scrambling sequence.

The number of physical antennas in a transmission point may be indicated to a UE by direct signaling. Specifically, the transmission point may indicate the number of antennas used in each EPDCCH.

Channel estimation using an EPDCCH DMRS in the above manner may also be used in receiving a PDSCH. For example, if a QLC relationship between an EPDCCH DMRS and a PDSCH DMRS is indicated by RRC signaling, a UE uses information derived from the EPDCCH DMRS in detecting the PDSCH DMRS. In the case where a plurality of EPDCCH sets are configured and transmitted by different transmission points, if a PDSCH is scheduled by a specific EPDCCH, it may be assumed that the PDSCH and the specific PDSCH are placed in the QCL relationship. Or if a PDSCH and an EPDCCH have the same initial DMRS scrambling sequence value, it may be assumed that the PDSCH and the EPDCCH are in the QCL relationship.

Apparatuses According to Embodiment of the Present Invention

Figure 11:
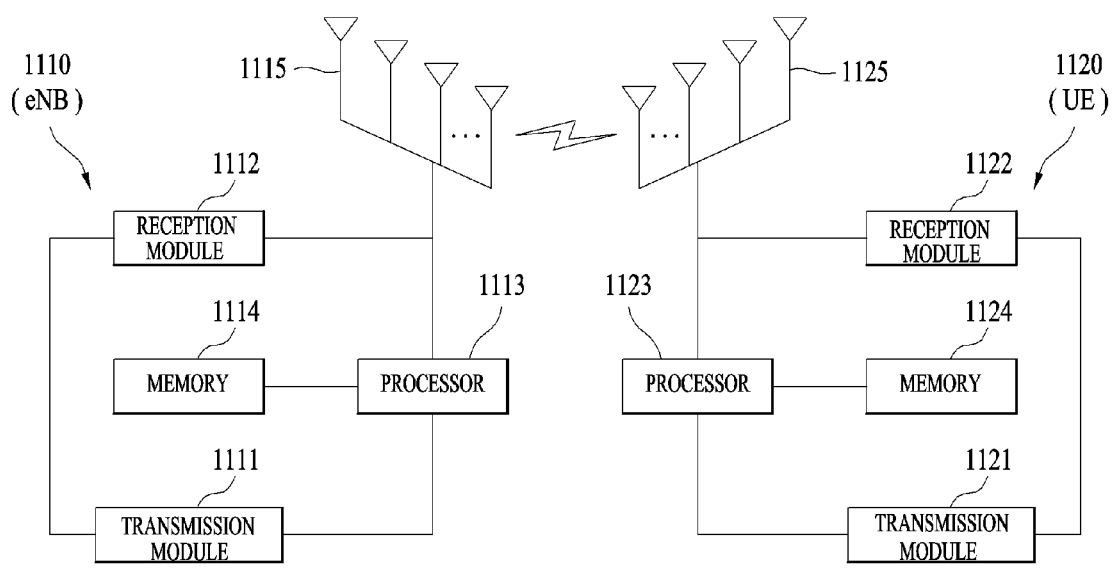
FIG. 11 is a block diagram of a transmission apparatus and a reception apparatus.

FIG. 11 is a block diagram of a transmission point and a UE according to an embodiment of the present invention.

Referring to FIG. 11, a transmission point 1110 according to the present invention may include a reception module 1111, a transmission module 1112, a processor 1113, a memory 1114, and a plurality of antennas 1115. The presence of the plurality of antennas 1115 means that the transmission point 1110 supports MIMO transmission and reception. The reception module 1111 may receive UL signals, data, and information from a UE. The transmission module 1112 may transmit DL signals, data, and information to a UE. The processor 1113 may provide overall control to the transmission point 1110.

The processor 1113 of the transmission point 1110 according to an embodiment of the present invention may perform operations needed to implement the afore-described various embodiments.

Besides, the processor 1113 of the transmission point 1110 computes and processes information received by the transmission point 1110 and information to be transmitted to the outside. The memory 1114 may store the computed and processed information for a predetermined time and may be replaced with a component such as a buffer (not shown).

Referring to FIG. 11 again, a UE 1120 according to the present invention may include a reception module 1121, a transmission module 1122, a processor 1123, a memory 1124, and a plurality of antennas 1125. The presence of the plurality of antennas 1125 means that the UE 1120 supports MIMO transmission and reception. The reception module 1121 may receive DL signals, data, and information from an eNB. The transmission module 1122 may transmit UL signals, data, and information to an eNB. The processor 1123 may provide overall control to the UE 1120.

The processor 1123 of the UE 1120 according to an embodiment of the present invention may perform operations needed to implement the afore-described various embodiments.

Besides, the processor 1123 of the UE 1120 computes and processes information received by the UE 1120 and information to be transmitted to the outside. The memory 1124 may store the computed and processed information for a predetermined time and may be replaced with a component such as a buffer (not shown).

The specific configurations of the above-described transmission point and UE may be implemented so that the foregoing various embodiments of the present invention may be applied independently or two or more of them may be applied simultaneously. To avoid redundancy, the same description is not provided herein.

In the description of FIG. 11, the description of the transmission point 1110 is applicable to a relay serving as a DL transmitter or a UL receiver, and the description of the UE 1120 is applicable to a relay serving as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Further, it is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention are applicable to various mobile communication systems.

The invention claimed is:

1. A method for a User Equipment (UE) receiving control information via an Enhanced Physical Downlink Control Channel (EPDCCH) in a wireless communication system, the method comprising:
performing channel estimation on a Physical Resource Block (PRB) pair set related to the EPDCCH; and
monitoring the EPDCCH in the PRB pair set based on the performed channel estimation,
wherein a plurality of Demodulation Reference Signal (DMRS) ports is allocated with same precoding applied to the plurality of DMRS ports when a transmission point transmitting the EPDCCH uses a single physical antenna, and
wherein the plurality of DMRS ports are used for performing the channel estimation.

2. The method according to claim 1, wherein the transmission point is one of a plurality of transmission points configured to transmit an EPDCCH to the UE.

3. The method according to claim 1, wherein the same precoding applied to the plurality of DMRS ports only when a representative antenna port is not used and the PRB pair set is for localized EPDCCH transmission.

4. The method according to claim 1, further comprising determining that the PRB pair set is for distributed EPDCCH transmission.

5. The method according to claim 4, wherein the channel estimation is performed using a DMRS corresponding to a port related to the distributed EPDCCH transmission.

6. The method according to claim 1, wherein a number of the physical antennas is determined according to a number of Cell-specific Reference Signal (CRS) ports of the transmission point.

7. The method according to claim 6, further comprising determining the number of CRS ports as the number of the physical antennas.

8. The method according to claim 6, further comprising determining the number of CRS ports by blind decoding of a Physical Broadcast Channel.

9. The method according to claim 1, wherein a number of the physical antennas is determined according to a number of ports used for Channel State Information-Reference Signal (CSI-RS) transmission from the transmission point.

10. The method according to claim 9, wherein information about the transmission point and the number of ports is transmitted via higher-layer signaling.

11. The method according to claim 9, wherein the transmission point uses a CSI-RS configuration having an initial value equal to an initial scrambling sequence value of a DMRS related to the EPDCCH.

12. A User Equipment (UE) for receiving control information on an Enhanced Physical Downlink Control Channel (EPDCCH) in a wireless communication system, the UE comprising:

a reception module; and a processor configured to:

perform channel estimation on a Physical Resource Block (PRB) pair set related to the EPDCCH, and monitor the EPDCCH in the PRB pair set based on the performed channel estimation, wherein a plurality of Demodulation Reference Signal (DMRS) ports is allocated with same precoding applied to the plurality of DMRS ports when a transmission point transmitting the EPDCCH uses a single physical antenna, and wherein the plurality of DMRS ports are used for performing the channel estimation.

13. The UE according to claim 12, wherein the transmission point is one of a plurality of transmission points configured to transmit an EPDCCH to the UE.

14. The UE according to claim 12, wherein the same precoding is applied to the plurality of DMRS ports only when a representative antenna port is not used and the PRB pair set is for localized EPDCCH transmission.

15. The UE according to claim 12, wherein the processor is further configured to determine that the PRB pair set is for distributed EPDCCH transmission.

16. The UE according to claim 15, wherein the channel estimation is performed using a DMRS corresponding to a port related to distributed the EPDCCH transmission.

17. The UE according to claim 12, wherein a number of the physical antennas is determined according to a number of Cell-specific Reference Signal (CRS) ports of the transmission point.

18. The UE according to claim 17, wherein the processor is further configured to determine the number of CRS ports as the number of the physical antennas.

19. The UE according to claim 12, wherein a number of the physical antennas is determined according to a number of ports used for Channel State Information-Reference Signal (CSI-RS) transmission from the transmission point.

20. UE according to claim 19, wherein the transmission point uses a CSI-RS configuration having an initial value equal to an initial scrambling sequence value of a DMRS related to the EPDCCH.

* * * * *